United States Patent [19]

Tonkin

[11] 4,236,814

[45] Dec. 2, 1980

[54] TRANSPORT SYSTEM FOR ADVANCING COPY SHEETS THROUGH TANDEM DUPLICATING SYSTEM

[75] Inventor: Kenneth J. Tonkin, Glenview, Ill.

[73] Assignee: A. B. Dick Company, Chicago, Ill.

[21] Appl. No.: 48,082

[22] Filed: Jun. 13, 1979

[51] Int. Cl.[3] .......................... G03B 27/32; G03B 27/52

[52] U.S. Cl. .......................................... 355/26; 271/4; 271/6; 355/76; 355/104

[58] Field of Search ........................ 355/76, 73, 24, 26, 355/23, 104; 271/4, 6

[56] References Cited

U.S. PATENT DOCUMENTS

| | | | |
|---|---|---|---|
| 4,095,979 | 6/1978 | DiFrancesco et al. | 355/26 X |
| 4,158,500 | 6/1979 | DiFrancesco et al. | 355/26 X |

*Primary Examiner*—Richard A. Wintercorn
*Attorney, Agent, or Firm*—Peter S. Lucyshyn

[57] ABSTRACT

In a tandem duplicating system, a transport means conveys a copy sheet from a first printing station where an image is applied to the first side of the copy sheet to a second printing station where an image is applied to the second side of the same copy sheet utilizing a suction force for securing the copy sheet to a sheet conveyor, wherein only the image-free side of the copy sheet is contacted or engaged by the conveyor. Advancing copy sheets are delivered to a position subjacent the second printing station where means normally disposed beneath the conveyor are activated to engage the trailing edge of the copy sheet lift it to a position above the transport means and advance the trailing edge of the sheet into gripping means provided in the second printing station for advancing the copy sheet through the second printing station and applying an image to its second side.

14 Claims, 9 Drawing Figures

FIG. 6
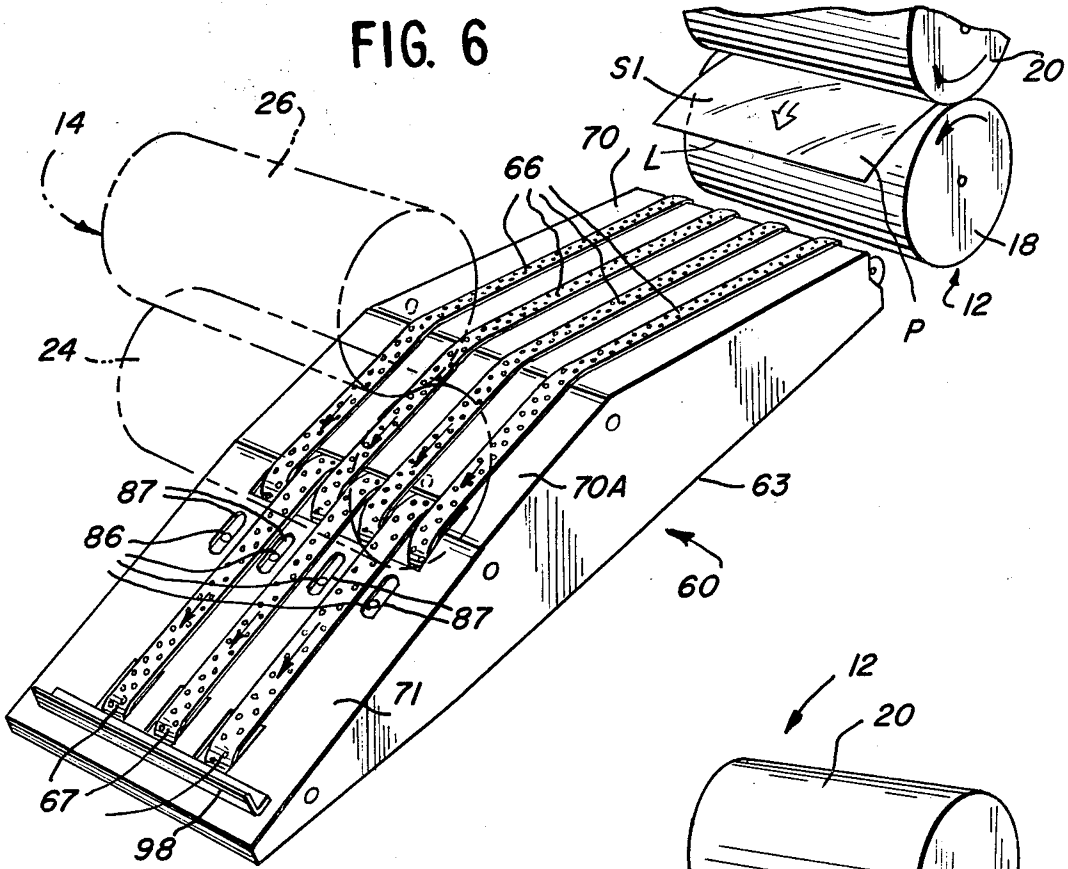
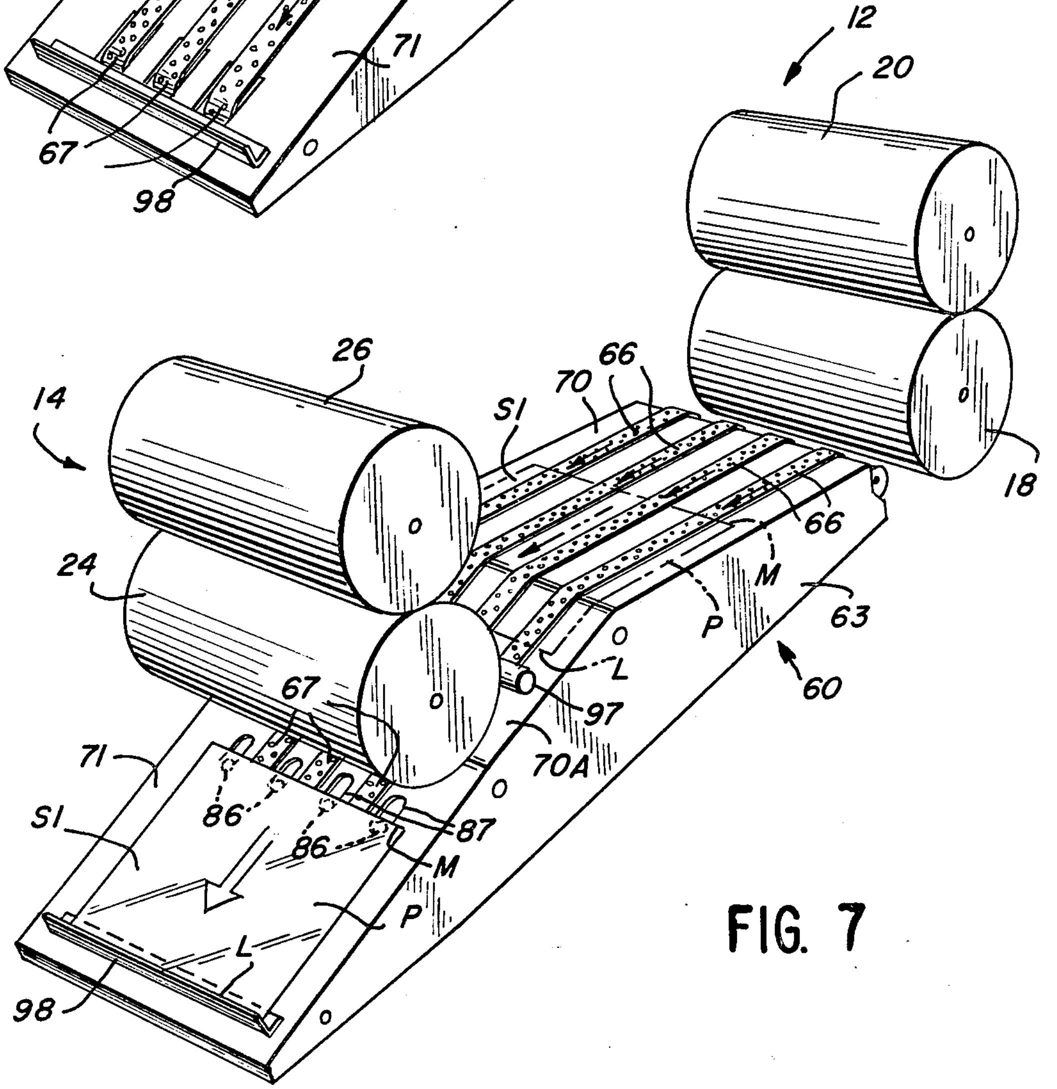
FIG. 7

FIG. 8
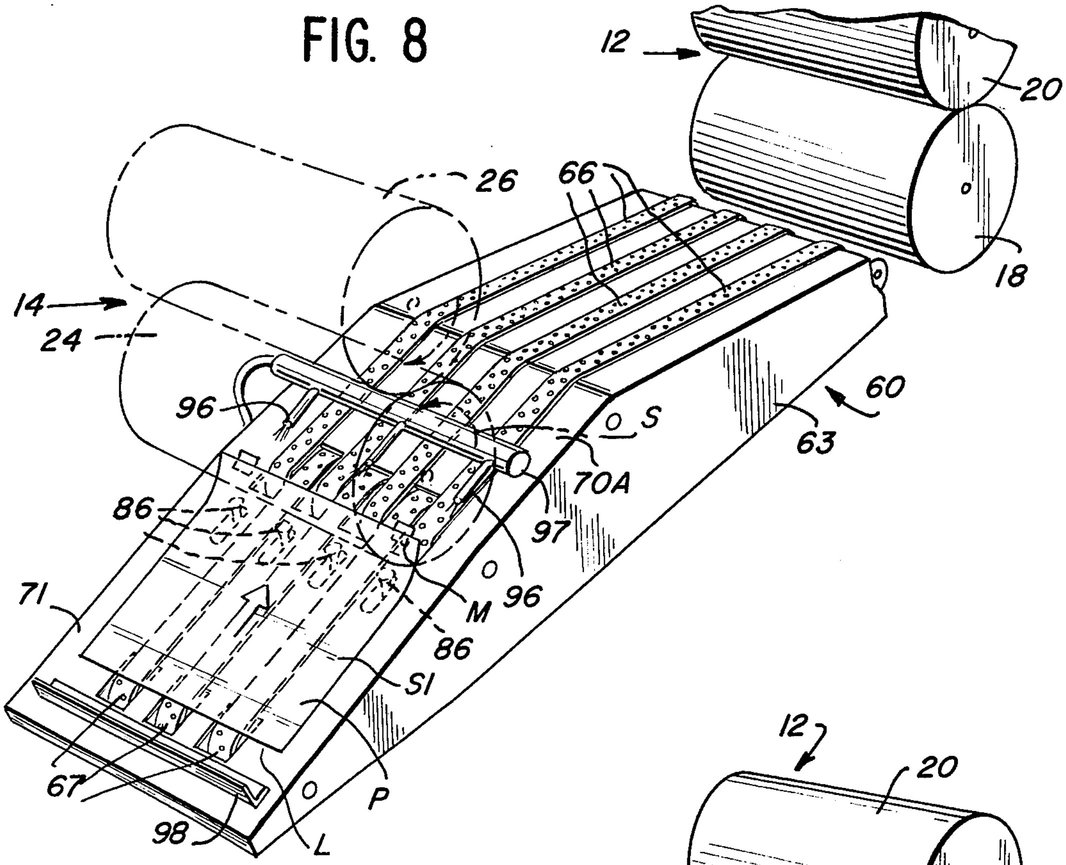
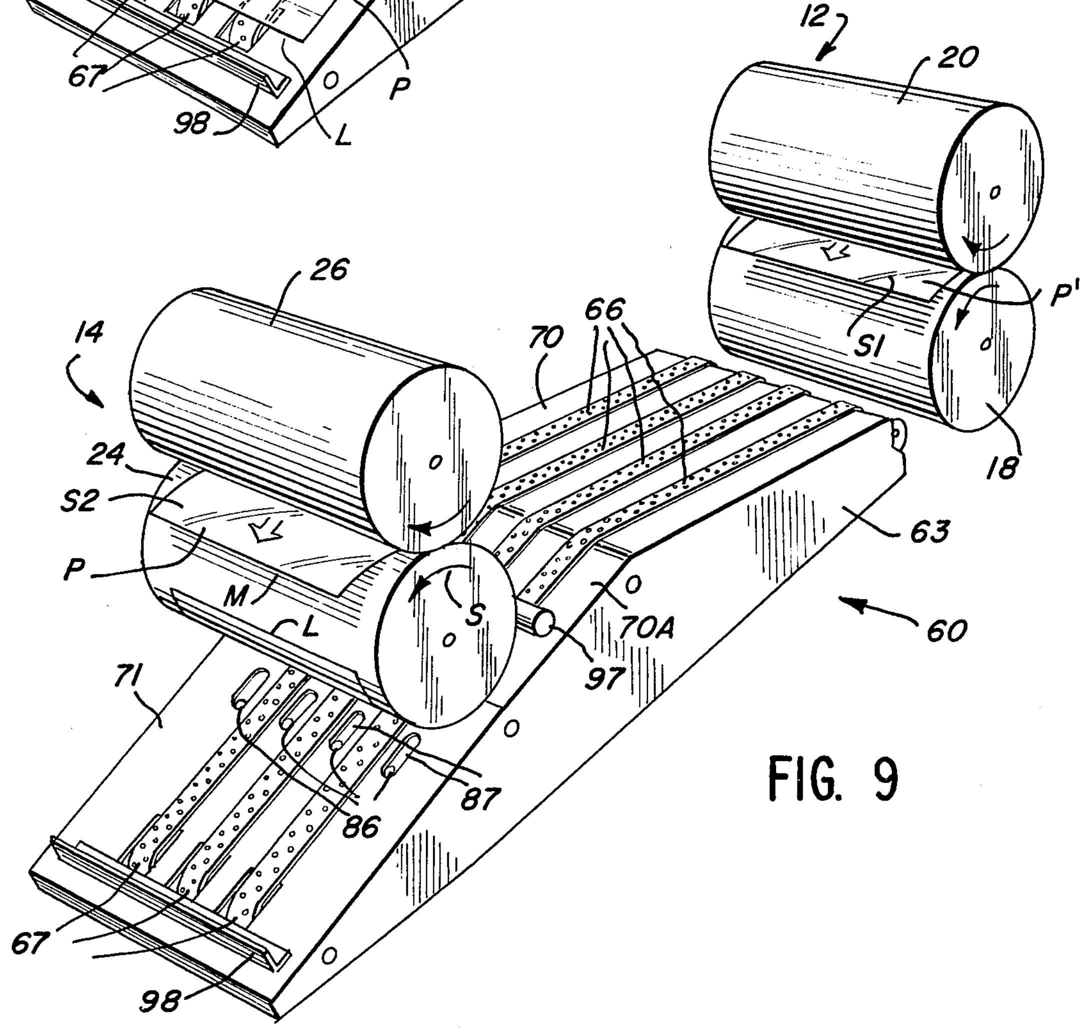
FIG. 9

TRANSPORT SYSTEM FOR ADVANCING COPY SHEETS THROUGH TANDEM DUPLICATING SYSTEM

BACKGROUND OF THE INVENTION

1. Field of the Invention

The subject invention is related to tandem duplicating systems for advancing copy sheets through two printing stations to generate two-sided copy, and is specifically directed to the reversing transport means thereof for conveying the copy sheets from the first printing station to the second printing station of the duplicating system.

2. Description of the Prior Art

There are various constructions of tandem duplicating systems having transport means for conveying copy paper from a first printing station to a second printing station for both dual pass printing and two-sided printing. One example of a prior art system is the Model 350-T duplicating system of A. B. Dick Company, Chicago, Illinois, the assignee of the present invention. This prior art system is depicted in FIGS. 1 and 2 of the drawings.

The tandem duplicators of the prior art transfer copy sheets from the first duplicating machine to the second duplicating machine by securing the sheet on a conveyor via tracking and gripping rollers, often resulting in ink-tracking and ink-smearing because the rollers engage that side of the sheet which is printed at the first machine, pick up ink and transfer it to other areas of the copy sheet. Various configurations of tandem duplicating systems of this type are disclosed in U.S. Pat. Nos. 2,625,101; 3,829,084; 3,944,218 and 4,015,522.

It is also known to utilize vacuum conveyor belts for transferring documents between remote stations, see for example, U.S. Pat. Nos. 3,889,801 and 4,047,812.

None of the known systems deals with or is directed to solving the problem of ink tracking during two-sided or dual pass duplicating.

SUMMARY OF THE INVENTION

The primary purpose of the present invention is to provide means which minimize or even eliminate all ink tracking during two-sided copying by incorporating a vacuum web conveyor in a tandem duplicating system and to provide in combination therewith a unique paper reversing mechanism wherein the copy sheet may be advanced along a generally horizontal path "straight through" from the first duplicating machine to a position subjacent the second duplicating machine where the copy sheet is reversed by lifting the trailing edge thereof into receiving means provided in the second duplicating machine.

A pair of duplicating machines are coupled in tandem, with transport means installed therebetween for conveying the copy sheets printed on one side at the first machine to the second machine for printing on the other side. The transport means includes a conveyor which receives copy sheets ejected from the first machine, the conveyor including a moving surface which engages only the image free side of the sheet ejected from the first machine, thus eliminating tracking lines produced by guide rollers and the like contacting the printed side of the copy sheet as it is advanced from one machine to the other. In the preferred embodiment, the conveyor is defined by a plurality of perforated moving webs which pass over an air plenum, wherein air is drawn through the perforations of the web and then exhausted through the plenum for generating a suction holding force securing the copy sheet to the moving webs.

The copy sheet is advanced to a position subjacent the second printing station where sheet transfer means are provided for lifting the copy sheet into the second printing station where it is received and an image is applied to its other side.

In the preferred embodiment, the transport means is described as installed in a tandem arrangement of offset duplicating machines, wherein the advancing copy sheet is delivered to a position subjacent the impression cylinder of the second machine with the trailing edge of the sheet disposed directly beneath the impression cylinder of the second machine. The transfer means comprise lifters normally disposed beneath the conveyor webs, which are advanced to engage the trailing edge portion of the copy sheet, lift it above the webs and advance it into the rotating grippers on the impression cylinder for advancement through the second duplicating machine.

An air curtain or the like may be provided for maintaining the lifted copy sheet in a position above the webs after the lifters are retracted, thus maintaining a gap between the lifted copy sheet and the next advancing copy sheet being delivered by the webs. The air curtain also aids in seating the lifted copy sheet flatly against the impression cylinder.

It is, therefore, a primary object of the invention to provide means for receiving copy sheets printed on one side at one printing station, transporting each copy sheet to a second printing station without "ink-tracking", and reversing it for printing on the other side.

It is another object of the invention to provide in a tandem duplicator a sheet conveyor which engages only the image free side of a copy sheet as it is advanced between printing stations.

Other features and advantages of the invention will be readily apparent from the accompanying drawings and description.

BRIEF DESCRIPTION OF THE DRAWINGS

FIGS. 6, 7, 8 and 9 are simplified diagramatic illustrations of the advancement of a copy sheet through a tandem duplicating system utilizing the transport means of the present invention.

DETAILED DESCRIPTION OF THE PREFERRED EMBODIMENT

Figure 1:
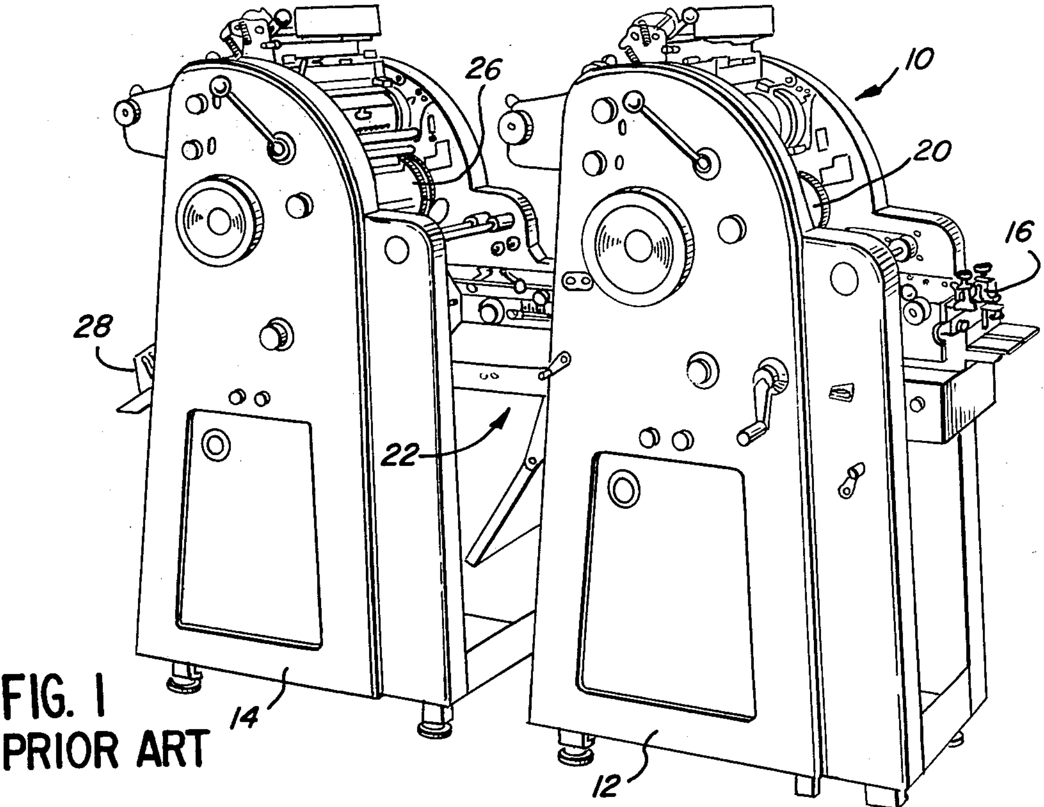
FIG. 1 PRIOR ART
FIG. 1 is a perspective view of a tandem duplicating system having a pair of offset duplicating machines coupled together by a prior art paper transport means.
Figure 2:
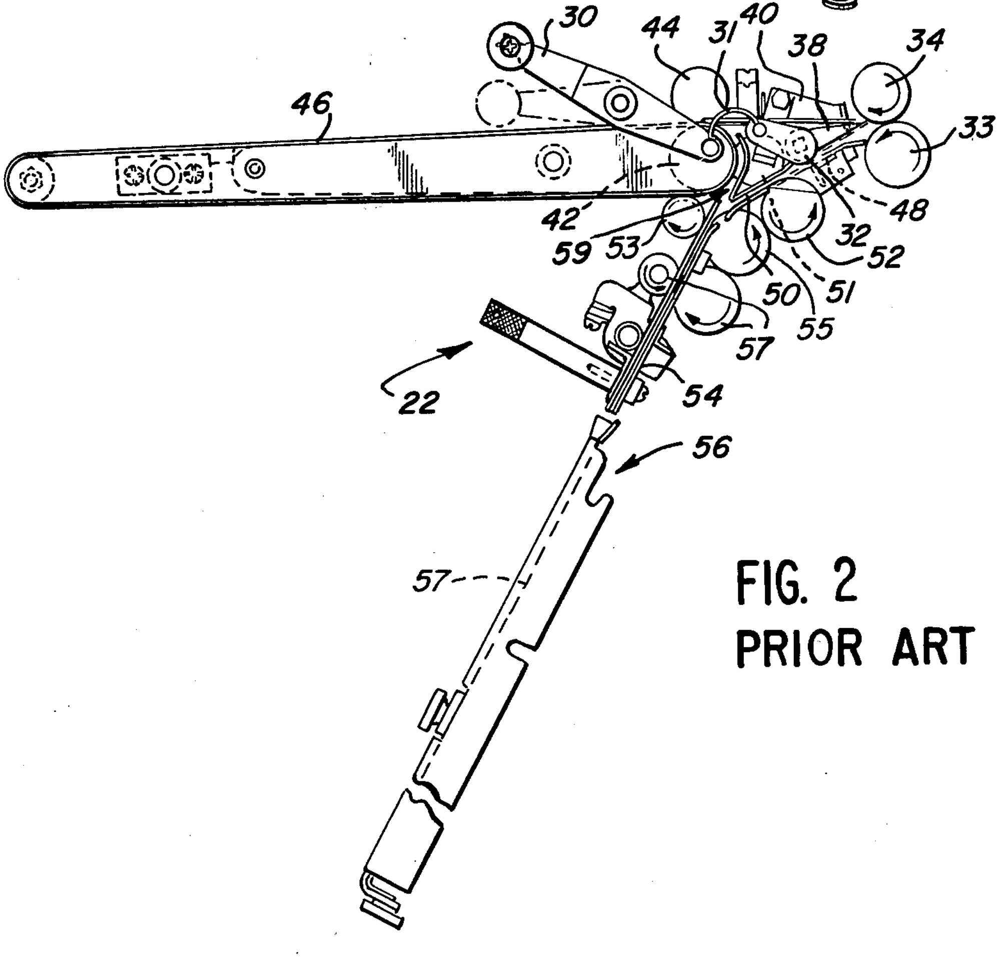
FIG. 2 PRIOR ART
FIG. 2 is a side elevation of the prior art paper transport means of the system illustrated in FIG. 1.

Initially referring to the prior art tandem duplicating system 10 of FIGS. 1 and 2, a copy sheet may be printed on both sides by first advancing it through the duplicating machine 12, where it is printed on one side and released into the prior art transport means 22, by which it is transported to and received by the second duplicating machine 14, where the copy sheet is printed on the second side and thereafter released into the receiving tray 28. Generally, a supply of copy paper is stored at paper tray 16, a single sheet of which is periodically received in timed sequence by grippers (not shown in FIG. 1) provided on impression cylinder 18 (not shown in FIG. 1, see FIG. 3) in the well known manner. The copy sheet is then advanced by the rotating impression cylinder into contact with the corresponding blanket cylinder 20, where an image is applied to that side of the sheet which engages the blanket cylinder.

In typical prior art systems, the copy sheet is ejected by means such as the roller assemblies 33, 34 onto the transport means 22, where it is advanced into either the reversing chute 56 or directly onto the conveyor webs 46, depending on the position of the deflection lever 30. For example, for "straight-through" printing wherein the copy sheet is printed on the same side at each machine, the lever 30 is in the position shown in FIG. 2 and pressure is applied to spring 31, causing the paper deflector assembly 32 to be rotated clockwise for lowering the deflector fingers 48. Copy sheets are then forwarded by rollers 33, 34 over fingers 48, between the upper deflector 38 and chute 40, between the conveyor drive roller 42 and the nip rollers 44, and onto conveyor webs or belts 46.

For "reversing" printing wherein the copy sheet is printed on one side at machine 12 and on the other side at machine 14, the lever 30 is lowered to the phantom position shown in FIG. 2, and spring 31 causes the paper deflector assembly 32 to be rotated counterclockwise, raising fingers 48, whereby copy sheets delivered by rollers 33 and 34 are advanced between chute 41 and lower assembly 50 and into top chute 54 of the reversing chute assembly 56. A cam operated mechanism (not shown) closes rollers 53, 55 to engage the copy sheet and drive it into lower chute 57 of the reversing chute assembly 56. The reversing chute assembly operates in typical manner with the cam mechanism then opening rollers 53, 55 and closing rollers 57 to engage the copy sheet and drive it upwards into chute 59, where the paper is engaged by rollers 44 and advanced onto conveyor webs 46. Nip or guide rollers disposed above conveyor webs 46 maintain the paper in continuous contact with the webs. Generally, the nip or guide rollers are disposed in spaced relationship across the width of the transport means 22.

It will be noted that both the printed and unprinted sides of the copy sheet are in almost continuous contact with chutes or rollers whether the "straight through" or "reversing" mode is employed. In some instances, this generates "ink-tracking" lines on that side of the copy sheet which is imaged or printed at the first duplicating machine 12 due to the contact of the apparatus with wet ink and the resultant smearing caused thereby.

The present invention minimizes tracking by providing for a transport means which only engages the copy sheet on its image free side once the sheet has been released by the first duplicating machine.

In accordance with the present invention, a paper transport is provided wherein only the image free side of the copy sheet is engaged once the copy sheet has been printed on one side and has been ejected from the first printing station. The sheet conveyor of the invention includes a movable surface which receives the image free side of the copy sheet and transports the copy sheet from the first print station to the second print station of the tandem duplicating system, after which sheet transfer means responsive to the arrival of the copy sheet at the second print station engage an image free area such as the image free side of the copy sheet and transfer the copy sheet into the second print station where the copy sheet is received and printed on its image free side.

A preferred embodiment of the invention is depicted in FIGS. 3-9, wherein the novel transport means 60 is shown installed in a tandem duplicating system including a first print station 12 having ejector means such as the roller assemblies 62 and platform 64 for ejecting copy sheets released from impression cylinder 18 onto the transport means. The roller assemblies 62 are driven in synchronized relationship with the rotating impression cylinder 18 in the well known manner. Drive gear 65 which drives the transport means 60 is also driven by means, not shown, in synchronized relationship with the rotation of cylinders 18 and 20 of the first duplicating machine. Only the image free side of the copy sheet is engaged by the transport means 60 as it is advanced out of paper support 64.

Figure 4:
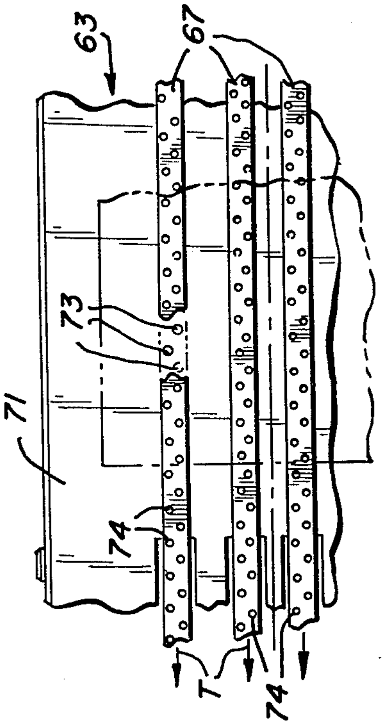
FIGS. 4 and 5 are fragmentary top elevation views of the transport means illustrated in FIG. 3, showing in detail the relationship between the conveyor webs and the transport plenum.
Figure 5:
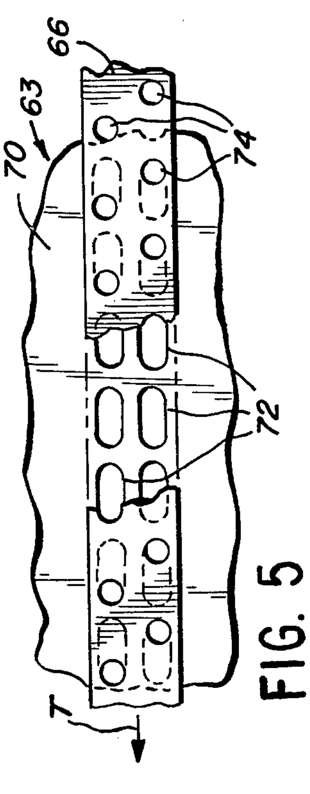

In the preferred embodiment, the transport means 60 includes a plenum or vacuum chamber 63 having an integral housing 68 including an outlet 69 for housing a vacuum source such as, by way of example, an exhaust fan, not shown. The top surface of plenum 63 is defined by a generally horizontal reach 70, 70A and a downwardly sloped reach 71. As shown in FIGS. 4 and 5, the top surface of the plenum 63 includes a plurality of through apertures 72, 73. Air is drawn by the fan into the apertures and through plenum 63 and is exhausted at outlet 69 for generating a suction force at the apertures. A plurality of endless webs or conveyor tapes 66, 67 are slideably received by the upper surface of plenum 63 and are perforated at 74 in such manner that movement of the webs 66, 67 in the direction of the arrows T brings the perforations in successive communication with the respective apertures 72, 73.

Baffle means are provided for controlling the vacuum force, wherein the force along reach 70, 70A is greater than that along reach 71. This facilitates introduction of the sheet into the second print station, as will be described. In the preferred embodiment, the baffle means are provided by utilizing different size apertures along reaches 70, 70A. As will be seen in FIGS. 4 and 5, the apertures 72 are elongated and therefore, are larger than the generally circular apertures 73. Thus, the perforations of webs 66 are in communication with each aperture 72 for a proportionately longer time than the corresponding perforations of webs 67 with each aperture 73. The different sizes of the apertures define a baffle means for controlling the flow of air through the respective portions of the plenum 63, whereby the suction force generated along reach 70, 70A is stronger than the suction force generated along reach 71.

The endless webs 66 pass over rollers 75, 76 and 77, which are driven in synchronized relationship with the printing stations via drive gear 65, and over idler wheel 82 and a tension adjustment means 80 where the tension of each web 66 may be individually adjusted. In the preferred embodiment, the webs 66 are disposed in spaced, parallel relationship and are spaced to accommodate the endless webs 67 which also pass over rollers 77 (see FIG. 6). Of course, other arrangements could be used. However, the particular embodiment illustrated facilitates in maintaining registration of the copy sheets as they advance from the first to the second station. The endless webs 67 pass over rollers 77 and 78, idler wheel 83 and a tension adjustment assembly 81 where the tension of each web 67 may be individually adjusted.

Each of the tension adjustment assemblies 80, 81 may comprise, by way of example, a roller 110, rotatably mounted on one end of a spring-loaded bell crank 112.

Figure 3:
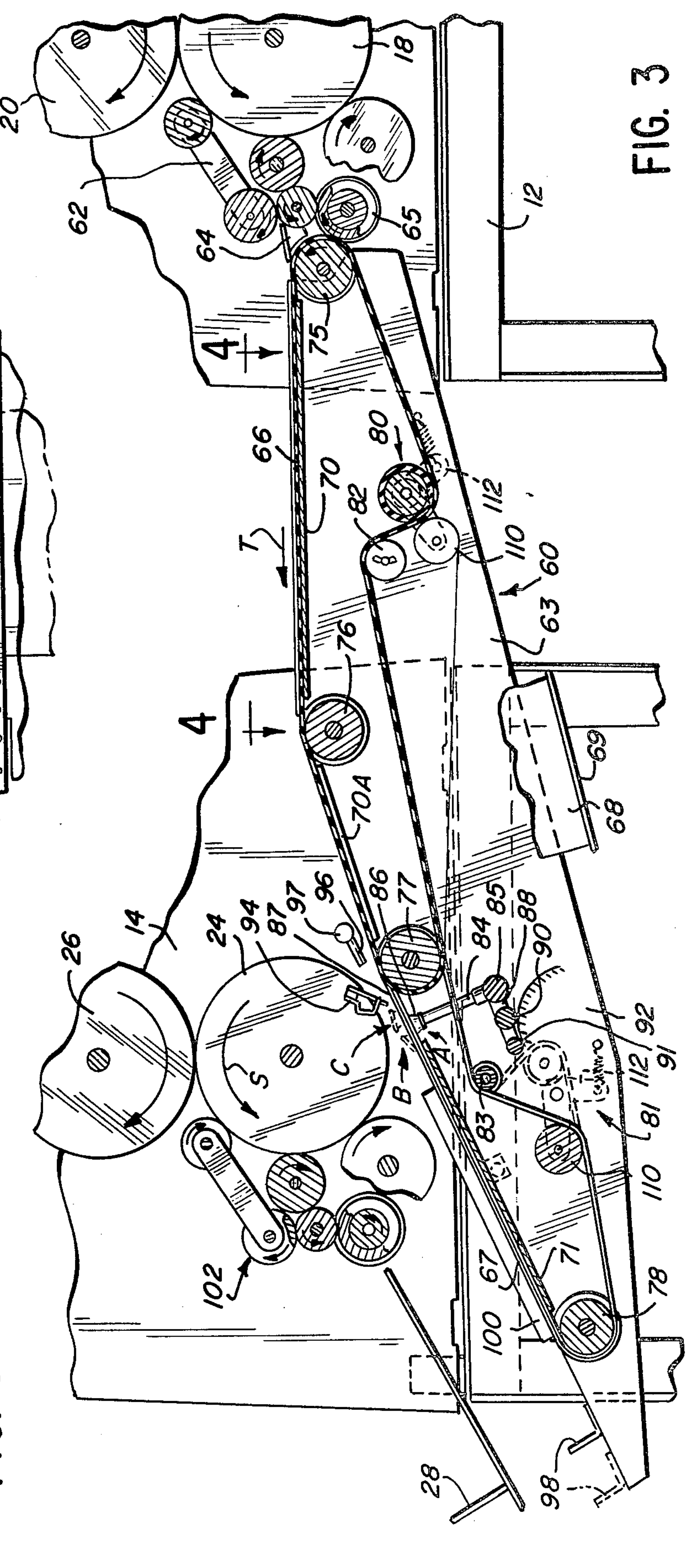
FIG. 3 is a side elevation view, partly in section, of the paper transport means of the present invention, shown installed in a tandem duplicating system including a pair of offset duplicating machines of the type illustrated in FIG. 1.

A plurality of spaced parallel elongated slots 87 are provided in reach 71 of the plenum 63, and are disposed intermediately of the spaced webs 67 (see FIGS. 3 and 6). The transfer means for engaging the copy sheet and introducing it into the second print station are normally disposed beneath the reach 71 of the plenum and are responsive to the arrival of a copy sheet to advance upwardly through slots 87 for lifting the copy sheet upwardly from the conveyor webs and advancing it into grippers provided in the second print station. In the preferred embodiment, the transfer means includes a plurality of sucker fingers or suction cups 86 disposed, one each, beneath each of the slots 87. Each cup is mounted on the end of a hollow tube 84 which is coupled to a vacuum source in typical fashion, whereby a suction force is generated at each of the suction cups 86. All of the tubes 84 are mounted on a cross-tube 85, each end of which is secured to one end of a lever 88 pivotably mounted in the plenum 63 at pivot 90. A cam follower 91 is mounted on the opposite end of lever 88 and engages the cam 92. The cam 92 is driven by means, not shown, in synchronized relationship with the rotation of impression cylinder 24 of the second duplicating machine 14.

The tubes 84 and suction cups 86 are shown in the retracted position A in FIG. 3. As the cylinder 24 rotates in the direction of the arrow S, and cam 92 rotates in corresponding relationship therewith, each of the suction cups 86 advances to position B (shown in phantom) for lifting the trailing edge of the sheet up from the webs, and as grippers 94 on cylinder 24 approach the suction cups, the cam advances the cups to position C (also shown in phantom) to bring the trailing edge of a copy sheet into engagement with the rotating grippers.

A plurality of open-ended tubes or nozzles 96 are disposed above webs 66 in advance of slots 87 and are directed toward the gap between the cylinder 24 and the reach 71 of the plenum. The tubes 96 are connected to a source 97 of air under pressure for generating an air curtain extending across the entire axial length of cylinder 24. The air curtain supports each copy sheet lifted by the suction cups 86 after the trailing edge thereof has been engaged by grippers 94 and cups 86 have been retracted to position A by rotation of cam 92. This keeps the gripped copy sheet above the webs 67 and out of interferring relationship with successive copy sheets being advanced by the transport means 60. The air curtain also aids in seating the gripped copy sheet flatly against cylinder 24.

A stop 98 is provided near the outer end of reach 71 for stopping the leading edge of a copy sheet which has been advanced by the webs 66, 67. The stop is adjustable to accommodate copy sheets of different lengths for precisely locating the trailing edges thereof in proper relationship with the suction cups 86 and the cylinder 24.

If desired, a cam operated jogger assembly 100 may be provided for registering the paper with cylinder 24. However, in practice it has been found that the jogger assembly has not been required since precise registration of the copy sheet has been maintained by the transport system throughout advancement of the copy sheet from duplicating machine 12 to duplicating machine 14.

Of course, it will be understood that a copy sheet, once clamped by grippers 94 is rotated into engagement with the blanket cylinder 26, where an image is applied to that side of the copy sheet in contact with the blanket cylinder, after which the sheet is received by roller assembly 102 for release into the receiving tray 28.

FIGS. 6–10 provide simplified diagramatic illustrations of the progression of a copy sheet from the impression and blanket cylinders 18, 20 of the first duplicating machine 12 to the impression and blanket cylinders 24, 26 of the second duplicating machine 14 via the novel transport system 60 of the present invention.

As diagramatically illustrated in FIG. 6, a copy sheet P is printed on side S1 as the sheet is advanced by the impression cylinder 18 into contact with the blanket cylinder 20 of the first duplicating machine 12. As the copy sheet P is released from the machine 12, the printed side S1 faces upward. The unprinted, or image free side S2 (see FIG. 9), is received by the conveyor webs 66, and the copy sheet is secured thereto solely by means of the suction force generated by the air flowing through the plenum 63. The movement of webs 66, 67 and cylinders 18, 20 and 24, 26 is synchronized to maintain at a minimum the relative motion between the copy sheet P and the engaged apparatus.

As shown in FIG. 7, the copy sheet P is advanced by movement of the webs 66 over reaches 70, 70A of the plenum and is advanced over reaches 71 by webs 67 until the leading edge L of the sheet engages stop 98. Due to the baffle arrangements provided, the suction force holding the sheet against the webs 67 is less than that holding the sheet against webs 66.

The copy sheet P is now stopped by stop 98 in a position subjacent the second machine 14 with its trailing edge M disposed directly beneath the impression cylinder 24 of the second printing machine 14, permitting reversal of the sheet in a unique manner by lifting the sheet up to and advancing the sheet into the grippers provided on cylinder 24 by means of the suction cups 86. As diagramatically shown in FIG. 8, the suction cups 86 are advanced upwardly to position B (see also FIG. 3) to engage the trailing end portion of sheet P and thence, rearwardly to position C, for advancing the trailing edge M of the sheet into the grippers 94 provided on cylinder 24 as the cylinder rotates in the direction of the arrow S. Of course, the movement of the suction cup lifters 86 is synchronized with the rotation of cylinder 24. The air curtain provided by nozzles 96 lifts the entire sheet P upwardly from webs 67 so that the printed side S1 of the next advancing sheet P′ does not touch the lower side S2 of sheet P.

As shown in FIG. 9, the unprinted side S2 of sheet P is rotated by cylinder 24 into engagement with the blanket cylinder 26, where an image is applied to the second side S2 of the copy sheet. The sheet is then released by machine 14 into the receiving tray 28 in typical manner (see FIG. 1).

While a preferred embodiment of my novel transport system has been described in detail herein, it should be understood that the system encompasses alterations and modifications which fall within the scope and spirit of the following claims defining the invention.

What is claimed is:

1. In a duplicating system having a first print station for applying an image to a first side of a copy sheet and a second print station for applying an image to a second side of the same copy sheet, the copy sheet having a leading edge and a trailing edge, and an improved paper transport means for transporting the copy sheet from the first print station to the second print station, the first print station including a sheet-ejector for introducing the copy sheet to the transport means and the second print station including a sheet receiver for receiving the copy sheet from the transport means, the improvement comprising:

(a) a sheet conveyor mounted between the first print station and the second print station for receiving a copy sheet ejected by the ejector means and engaging only the second side thereof, the sheet conveyor having a surface movable in one direction for transporting the copy sheet from the first print station to the second print station; and (b) a sheet transfer means responsive to arrival of the copy sheet at the second print station for transferring the trailing edge of the copy sheet to the sheet receiver of the second print station with the second side of the copy sheet oriented to have an image applied thereto.

2. The apparatus of claim 1, wherein said ejector means includes means for directing a copy sheet ejected from the first print station onto said conveyor movable surface with the second side of the copy sheet facing said surface.

3. The apparatus of claim 1 wherein said sheet transfer means includes a set of sucker fingers for engaging a trailing end of the copy sheet to move it toward the second print station sheet receiver.

4. The apparatus of claim 2 wherein the sheet receiver is a gripper and said sucker fingers feed the copy sheet trailing end directly into said gripper.

5. The apparatus of claim 1, wherein said sheet conveyor includes means for positioning each advancing copy sheet with a trailing edge thereof subjacent the second print station and wherein said sheet transfer means includes means for engaging the second side of a copy sheet, and lifting the trailing edge thereof above the sheet conveyor and thence advancing said trailing edge into the receiver means of the second print station.

6. The apparatus of claim 1, wherein the conveyor moving surface comprises a moving, perforated membrane, and wherein there is further included in communication with the underside of said membrane suction means for drawing a vacuum, whereby the copy sheet released from the first print station is drawn toward and securely, though releasably, attached to the membrane.

7. The apparatus of claim 6, wherein said suction means comprises a chamber subdivided into tow zones, the first zone adjacent said first print station and the second zone adjacent said second print station, the vacuum force supplied by said suction means being stronger in said first zone than in said second zone.

8. The apparatus of claim 5, wherein the means for locating the copy sheet further comprises an adjustable stop associated with the sheet conveyor for receiving a leading edge of the copy sheet, the stop being selectively movable any of predetermined positions for accommodating copy sheets of different lengths.

9. The apparatus of claim 5, the apparatus further including means for suspending the copy sheet above the sheet conveyor means after it has been received by the receiver means of the second print station.

10. In a duplicating system having a first print station including a first imaging surface for printing one side of a copy sheet, a first impression cylinder having means for gripping and conveying the copy sheet into contact with the first imaging surface, and ejector means for thereafter ejecting the copy sheet, a second print station including a second imaging surface for printing a second side of the same copy sheet, a second impression cylinder having means for gripping and conveying the copy sheet into contact with the second imaging surface, and ejector means for thereafter ejecting the copy sheet, an improved transport means for receiving the copy sheet after it has been ejected from the ejector means of the first print station and for conveying the copy sheet to the second print station, the improvement comprising:

(a) a sheet conveyor adapted for engaging only the unprinted side of said copy sheet after it has been ejected by the ejector means of the first print station for conveying the copy sheet to the second print station;

(b) means associated with the sheet conveyor for positioning the conveyed copy sheet to a position subjacent the second print station with the trailing edge of the copy sheet disposed beneath the second impression cylinder; and (c) transfer means for lifting the trailing edge of the conveyed copy sheet to a position above said sheet conveyor for engagement by the gripping means of said second impression cylinder.

11. The apparatus of claim 10, wherein said sheet conveyor is disposed in a generally horizontal plane.

12. The apparatus of claim 10, the positioning means further comprising a stop disposed in intercepting relationship with the conveyed copy sheet leading edge for intercepting and limiting the movement thereof.

13. The apparatus of claim 10, the transfer means further comprising:

(a) a plurality of lifters movable between a fully retracted position beneath said conveyor and a first advanced position above said conveyor and a second advanced position toward said second impression cylinder;

(b) means for moving the lifters between the fully retracted position and the first advanced position in synchronization with rotation of the second impression cylinder; and (c) means for moving the lifters from the first advanced position to the second advanced position toward the gripping means on said second impression cylinder as the grippers thereon rotate toward said lifters.

14. The apparatus of claim 13, further including means for suspending the copy sheet above said conveyor when the trailing edge thereof has been lifted to the gripping means of said second impression cylinder by said lifting means.

* * * * *